No. 12,521. ISSUED AUG. 14, 1906.
L. W. LUELLEN.
VOTING MACHINE.
APPLICATION FILED DEC. 7, 1901.
3 SHEETS—SHEET 1.
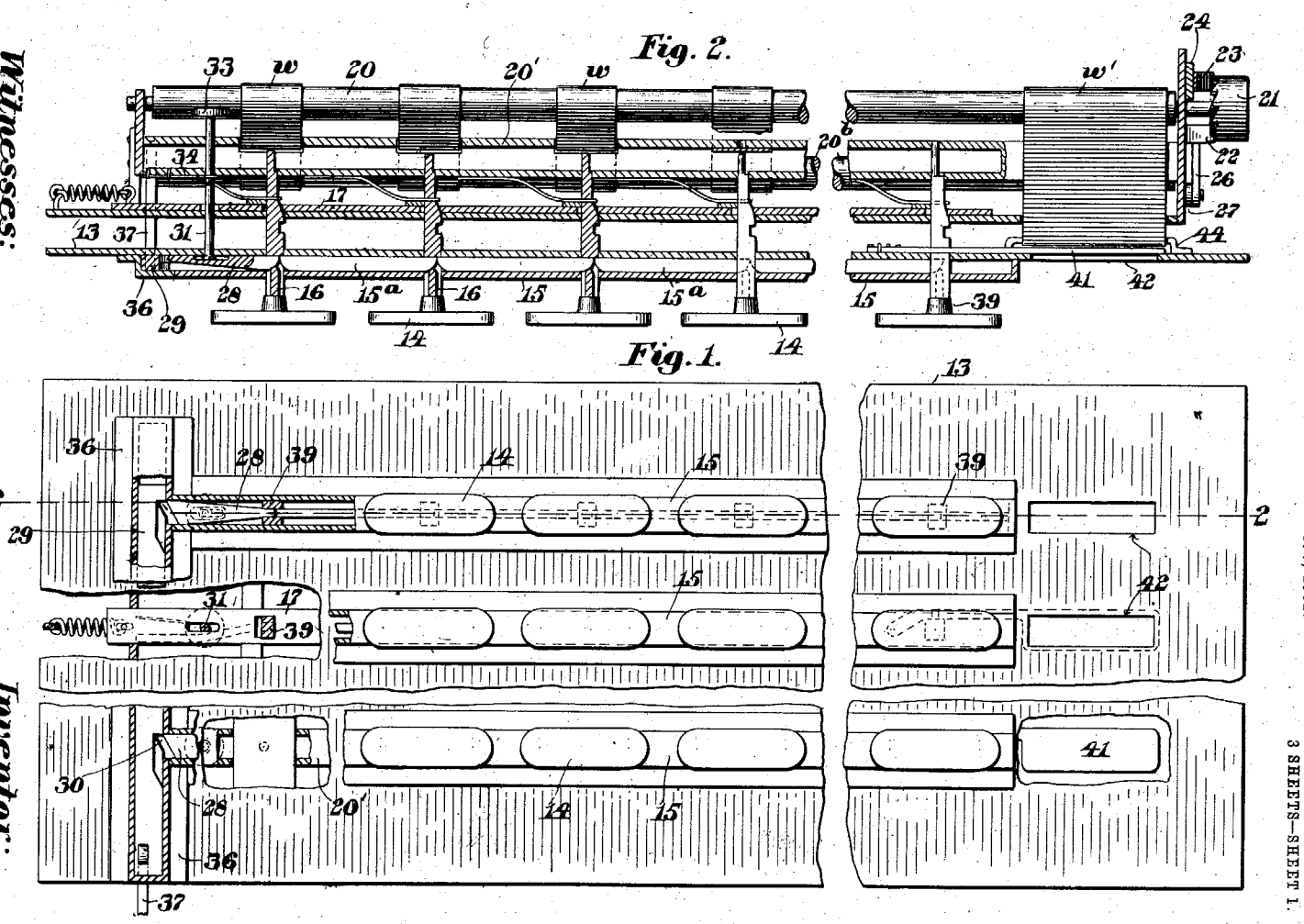
Witnesses:
Charles F. Logan.
Edwin F. Luce
Inventor:
Lawrence W. Luellen,
by Lombard & Cobb
Attys.

No. 12,521. REISSUED AUG. 14, 1906.

L. W. LUELLEN.

VOTING MACHINE.

APPLICATION FILED DEC. 7, 1901.

3 SHEETS—SHEET 2.

Witnesses:
Charles F. Logan.
Edwin T. Luce

Inventor:
Lawrence W. Luellen,
by Lombard & Cobb Attys.

No. 12,521. REISSUED AUG. 14, 1906.
L. W. LUELLEN.
VOTING MACHINE.
APPLICATION FILED DEC. 7, 1901.
3 SHEETS—SHEET 3.
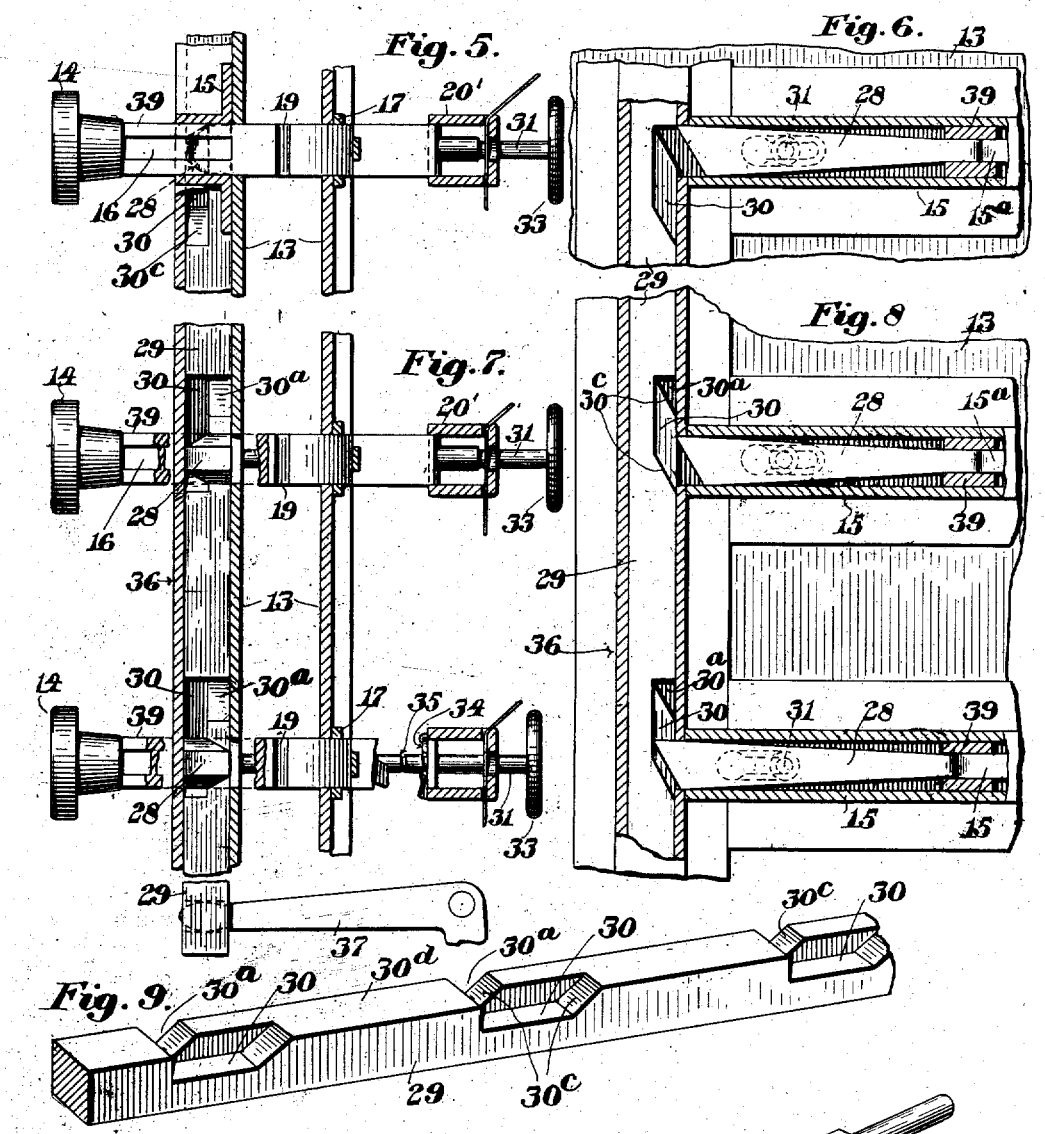
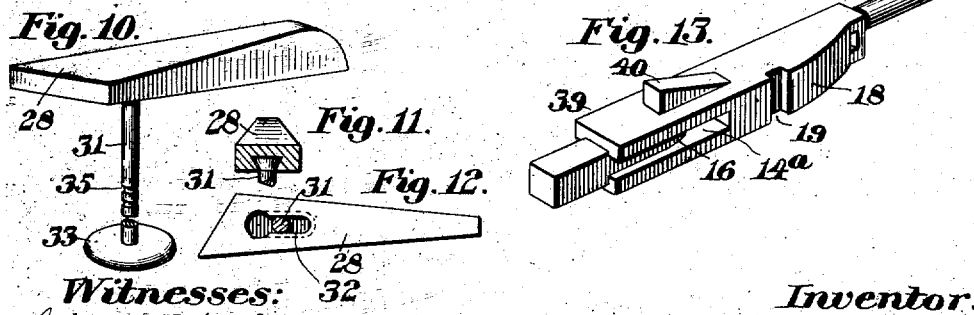
Witnesses:
Charles F. Logan.
Edwin P. Luce
Inventor:
Lawrence W. Luellen,
by Lombard & Cobb Attys.

UNITED STATES PATENT OFFICE.

LAWRENCE W. LUELLEN, OF OLATHE, KANSAS, ASSIGNOR OF ONE-HALF TO D. H. HEFLEBOWER, OF MIAMI COUNTY, KANSAS.

VOTING-MACHINE.

No. 12,521. Specification of Reissued Letters Patent. Reissued Aug. 14, 1906.

Original No. 681,802, dated September 3, 1901. Application for reissue filed December 7, 1901. Serial No. 85,109.

*To all whom it may concern:*

Be it known that I, LAWRENCE W. LUELLEN, a citizen of the United States, residing at Olathe, in the county of Johnson and State of Kansas, have invented certain new and useful Improvements in Voting-Machines; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to certain new and useful improvements in voting-machines, having reference more particularly to such a machine as that described and claimed in my United States Patent, Reissue No. 11,938. Its principal object is to provide an effective apparatus of this character.

It consists in the various features and combinations hereinafter described and more particularly claimed.

Figure 14:
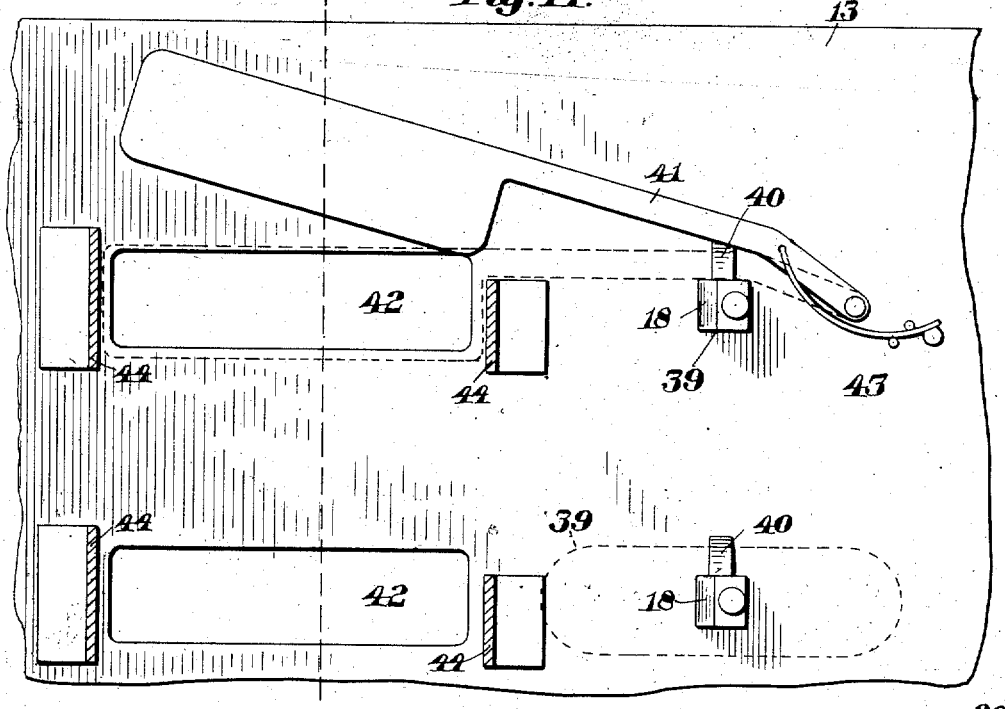
Figure 3:
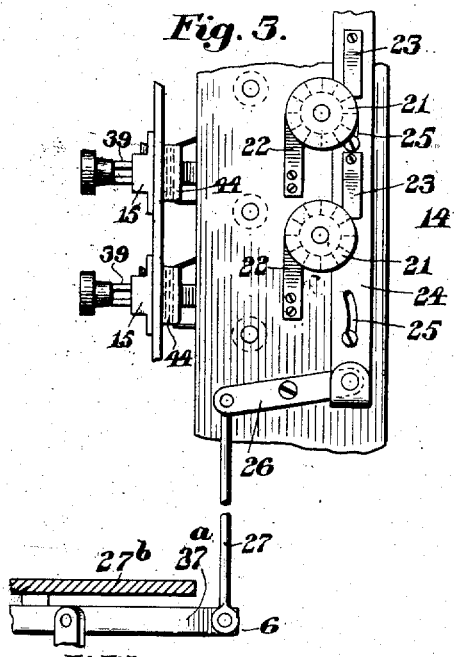
Figure 15:
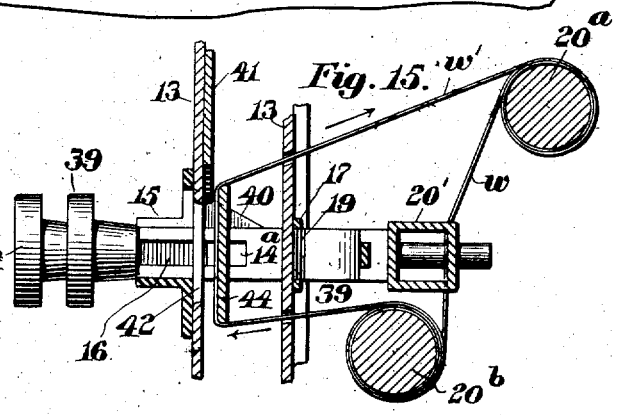
Figure 4:
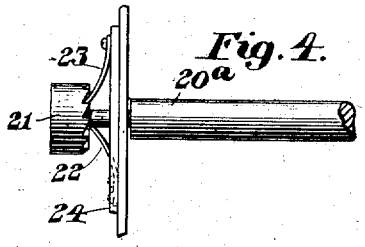

Referring to the accompanying drawings, forming a part of this specification, in which like characters of reference indicate similar parts throughout, Figure 1 is a front elevation of a voting-machine embodying one form of my invention, parts being broken away. Fig. 2 is a horizontal sectional view thereof on the line 2 2 of Fig. 1. Fig. 3 is a broken side elevation of the ratchet web-feed mechanism with its platform connections. Fig. 4 is a detail view, in rear elevation, of one of the ratchet-wheels of said mechanism. Fig. 5 is a vertical sectional detail through the keyboard, showing an end dog in its inner position. Fig. 6 is a front sectional elevation thereof. Fig. 7 is a view similar to Fig. 5, showing one end dog in its inner position and another end dog in its outer position with the locking member drawn into coaction with the latter. Fig. 8 is a front sectional elevation of Fig. 7. Fig. 9 is a perspective view of a portion of the locking member, showing the formation of the cam-notches. Fig. 10 is a perspective view of an end dog with its operating means. Fig. 11 is a transverse section thereof. Fig. 12 is a rear elevation of the end dog. Fig. 13 is a perspective view of the independent-voting key with its finger-piece removed. Fig. 14 is a rear sectional elevation of a portion of the independent-voting mechanism, and Fig. 15 is a partial vertical transverse sectional view thereof.

The numeral 13 designates a base-board or keyboard which may consist of two parallel plates of sheet metal, through which may slide series of spring-pressed candidate-keys or devices 14, arranged in lined groups or rows forming office-voting mechanisms and provided with transverse perforations at $14^a$ to form a continuous channel through each line of keys by the aid of a casing 15, attached to the keyboard. Locking-dogs $15^a$, provided with beveled ends, are located within this channel in a set or train and are preferably adapted to be forced apart by partitions 16 in the perforations of the keys; but the longitudinal movement of the dogs is so limited as to permit of but one partition passing at a time, thus preventing all other keys in the row from being operated when one is depressed and restricting their operation. A spring-pressed locking-strip 17 may receive the shanks of all keys in each row through suitable perforations and is adapted when a key is depressed to first be moved longitudinally by a cam-face 18 against the action of its spring and then to snap within a slot 19 at the end of said cam-face, and so lock the key in its depressed position. For each row of keys there are arranged on the back of the keyboard a pair of rolls $20^a$ $20^b$ to support record-receiving members consisting of webs or ribbons *w*, of paper or other suitable material, and a preferably hollow metallic tube 20′, forming a guide-strip through which the web is fed from these rolls and through openings in which the ends of the keys are adapted to be pressed for perforating or otherwise marking said web to produce a record. The receiving-roll $20^a$ of each pair may be provided at its end with a ratchet-wheel 21, which is engaged by a spring-pawl 22, fixed to the supporting-frame, and also engaged diametrically opposite by an inverted spring-pawl 23, carried by a sliding rod or bar 24. This rod may be mounted on the supporting-frame by screws or the like projecting through suitable slots 25 and operated by a lever 26, connecting it to a rod 27, which in turn connects with a lever $27^a$, supporting a platform $27^b$, forming the floor of a booth which may inclose the voting-machine. Thus a voter by stepping on the platform elevates one end of the lever $27^a$ through the rod 27, and so lowers the rod 24, moving by means of the ratchet mechanism the webs to a position to receive the record of another voter.

One of the dogs of each row of keys, conveniently an end dog 28, is formed with its inner end preferably beveled similarly to the other dogs, but with its outer end conveniently formed as illustrated, and is provided with means for moving it independently of the key-locking movement, preferably laterally of the channel in a plane and direction intersecting that in which the key-locking movement occurs. A locking device, here shown as a bar 29, extends across the path of the end dogs and is capable of movement, in the present instance longitudinally. This locking-bar is provided with a number of adjacent notches or recesses, here shown as two in number, 30 30[a], of different size and occupying different longitudinal planes to receive the projecting ends of the end dogs, and each recess is formed with a cam-face 30[c], located at different distances from the upper alined ends of said notches. It will therefore be seen that if the end dogs lie in the plane of the notches 30 they are unaffected by an upward movement of the locking-bar equal to the length of the bottom of the notch; but when in the plane of the notches 30[a] said upward movement forces the cam-face against the end dog, which rides up upon outer or locking faces 30[d] 30[d] of the bar, which lie in the planes of the recesses 30 30[a], and thereby deprive that row of dogs of all play, so that all keys in the row are prevented from being operatively depressed. To throw the end dog into coaction with one series of recesses or the other, and thus bring them under the influence of the locking device to permit of class-voting, there is provided selective or throw-out devices for moving the end dogs and locking devices relatively to each other. In the present instance the end dogs are moved, and a convenient device for this purpose is illustrated, consisting of a stem or member 31, operating through the base-board and having an enlargement at one end to fit within an elongated slot 32 in the end dog, so formed that said dog may be free to move laterally of the stem without being disengaged therefrom. The stem 31 may have a button or finger-piece 33 at its opposite end, by which the proper officer may set the end dogs in the desired position before the polls are opened, and a spring 34 may be attached to the guide-strip and adapted to occupy one or the other of a pair of grooves 35 to retain said stem in the position in which it is placed. The locking-bar is conveniently housed within a sheet-metal casing 36, through openings in the side of which the end dogs operate and may be operated by a lever 37 through a connection 38. When this lever is moved the proper distance by the attendant, the end dogs, which have been previously set to coact with the notches 30[a], are moved along their channels to lock the keys of that row, as previously described, and when the lever is retracted these end dogs are again free to be forced outward by the depression of a key in their respective rows. To bring the cam-faces of the recesses 30 into play, it is only necessary to allow the operating-lever a longer range of movement, and in this manner and by the provision of a locking-bar with a suitable number of sets of recesses any desired number of classes of voters may be provided for or the entire system of keys locked.

At any convenient location, but preferably at its left extremity, each line of keys may be provided with an independent-voting key 39, which may be substantially identical with the other keys, but is supplied on the upper part of its stem with a cam-face 40, with which coacts the stem of a shutter 41, conveniently pivoted to the rear of the front plate of the keyboard and adapted to cover an opening or slot 42 in said front plate when in its lower position and to be elevated to free said opening when forced upward against the pressure of a spring 43 by the cam-face on the depression of the key. In this instance a web *w'* instead of passing through the guide-strip 20' travels through suitable slots in the rear plate of the keyboard and over a platen 44, which is located opposite the slot 42. When the independent-voting key is depressed, its partition 16 forces the dogs on each side together, as with the other keys, and the cam-face 40 presses the shutter 41 upward to free the slot and expose a portion of the web, when a voter may write the name of his candidate thereon and is prevented from casting more than one vote in this particular office row by the means common to the other keys.

A voter on opening the entrance-door of the inclosing booth, which by any suitable means retracts the locking-strip 17, releases all the keys which may have been depressed and locked, including the independent-voting keys, and thereby permits the shutters 41 to drop. When the voter steps upon the platform, the web-rolls for all the keys are operated and a new surface presented for the record.

It is obvious that numerous changes in the details of arrangement and construction of parts may be resorted to without departing from the spirit and scope of this invention as herein described and claimed.

Having thus described my invention, I claim—

1. In a voting-machine, the combination with a plurality of keys, of a set of locking-dogs therefor movable toward and from the keys, means for moving one of the dogs independently of the remainder of the set in a direction intersecting that in which the key-locking movement occurs, and a locking device coacting with the last-named dog.

2. In a voting-machine, the combination with a plurality of keys, of a set of locking-dogs therefor movable toward and from the keys, means for moving an end dog independently of the remainder of the set in a direction intersecting that in which the key-locking movement occurs, and a locking device coacting with the end dog.

3. In a voting-machine, the combination with a plurality of keys, of a set of locking-dogs therefor movable toward and from the keys, means for moving one of the dogs independently in a direction intersecting that in which the key-locking movement occurs, and a locking-bar provided with recesses coacting with the last-named dog.

4. In a voting-machine, the combination with a series of rows of keys, of sets of locking-dogs therefor movable toward and from the keys, means for moving one of the dogs independently in a direction intersecting that in which the key-locking movement occurs, and a locking-bar provided with sets of recesses of different size coacting with the last-named dog.

5. In a voting-machine, the combination with a plurality of keys, of a set of dogs movable to lock certain of the keys, and means for moving a dog independently of the key-locking movement and of the companion dogs whereby the movement of the remainder of the set may be controlled.

6. In a voting-machine, the combination with a plurality of keys, of a set of dogs movable to lock certain of the keys, means for moving a single dog of the set independently of the key-locking movement whereby the movement of the remainder of the set may be controlled, and a locking device coacting with the set of dogs.

7. In a voting-machine, the combination with a plurality of keys, of a set of dogs movable to lock certain of the keys, means for moving a dog independently of the key-locking movement whereby the movement of the remainder of the set may be controlled, and a locking device coacting with the movable dog only.

8. In a voting-machine, the combination with a plurality of keys, of a set of dogs movable to lock certain of the keys, means for moving a dog independently of the key-locking movement whereby the movement of the remainder of the set may be controlled, and a locking-bar provided with a plurality of recesses with which the movable dog may coact.

9. In a voting-machine, the combination with a plurality of keys, of a channel adjacent thereto, locking-dogs sliding longitudinally in said channel, and means for moving at least one of the dogs laterally of the channel.

10. In a voting-machine, the combination with a plurality of keys, of a channel adjacent thereto, locking-dogs sliding longitudinally in said channel, and a member connected to one of the dogs for moving it laterally of the channel, the connection being such that a relative movement between the member and dog is permitted.

11. In a voting-machine, the combination with a plurality of keys, of a set of locking-dogs therefor, and a locking device provided with adjacent recesses of different size any one of which may coact with one of the dogs.

12. In a voting-machine, the combination with a plurality of keys, of a set of locking-dogs therefor, and a locking device provided with adjacent recesses of different length any one of which may coact with one of the dogs.

13. In a voting-machine, the combination with a plurality of keys, of a set of locking-dogs therefor, and a locking device provided with recesses of different size the walls of which form cam-faces.

14. In a voting-machine, the combination with a plurality of keys, of a set of locking-dogs therefor, and a locking device provided with recesses of different size the walls of which form cam-faces leading to locking-faces.

15. In a voting-machine, the combination with a plurality of keys, of a set of locking-dogs therefor, and a locking device moving laterally of the set of dogs and provided with a recess which may receive one of them, and a second recess at one side of the plane in which the first recess moves.

16. In a voting-machine, the combination with a series of rows of keys, of sets of locking-dogs therefor, and a locking device moving laterally of the sets of dogs and provided with a plurality of recesses lying in different planes which may receive one of the dogs.

17. In a voting-machine, the combination with a plurality of keys, of a set of locking-dogs therefor, a locking device provided with a plurality of recesses, and means for moving a dog to permit it to occupy one or another of the recesses.

18. In a voting-machine, the combination with a plurality of keys, of a set of locking-dogs therefor, a locking device provided with a plurality of recesses, and a key for moving a dog to permit it to occupy one or another of the recesses.

19. In a voting-machine, the combination with a series of rows of keys, of sets of locking-dogs therefor, and a locking device movable into different positions and provided with a plurality of faces occupying different longitudinal planes with which at least one of the dogs of each set may coact, each of these faces being adapted to prevent the movement of different rows of keys according to the position of the locking device and coacting dogs.

20. In a voting-machine, the combination with a series of rows of keys, of sets of locking-dogs therefor, and a locking device longitudinally movable into different positions and provided with a plurality of faces occupying different longitudinal planes with which at least one of the dogs of each set may coact, each of these faces being adapted to prevent the movement of different rows of keys according to the position of the locking device and coacting dogs.

21. In a device of the character described, a series of keys, a train of movable dogs for restricting the operation of the keys, the end dog of said train being capable of lateral movement, a locking-bar having a cam-face for moving the end dog longitudinally, and means for moving the end of the end dog laterally to avoid said cam-face.

22. In a device of the character described, a series of keys, a train of movable dogs for restricting the operation of the keys, the end dog of said train being capable of lateral movement, a locking-bar having a double cam-face for moving the end dog longitudinally, and means for moving the end dog laterally to be operated upon by one or the other of said cam-faces, substantially as described.

23. In a device of the character described, a series of keys, a train of locking-dogs with cam ends adapted to be forced apart by the depression of the keys and to limit the number of keys depressible at one time, the end dog of said train being capable of lateral movement, a sliding locking-bar having a double cam-face for moving the end dog longitudinally, and means for moving the end dog laterally to a position to be operated upon by one or the other of said cam-faces, substantially as described.

24. In a voting-machine, the combination with a row of movable keys, of a series of locking-dogs supported for movement in a plane intersecting said keys and the end dog of which is supported for longitudinal and transverse movement, a locking-bar supported for movement in a plane intersecting the path of the series of dogs and having two cam-faces disposed in adjacent planes one in advance of the other, means for actuating said locking-bar, and means for shifting the end dog into the path of one or the other of the cam-faces.

25. In a device of the character described, a supporting-frame, a web-roll journaled therein, a ratchet-wheel carried by the web-roll, a pawl on the supporting-frame engaging the ratchet-wheel, a rod having curved slots, pins connecting the rod and supporting-frame entering said curved slots, a movable platform, and a connection between the platform and rod whereby a movement of the platform will actuate the web-roll, substantially as described.

LAWRENCE W. LUELLEN.

Witnesses:
WALTER E. LOMBARD,
SYLVANUS H. COBB.